April 21, 1970         K. L. SHELTER         3,507,191
EFFECTIVE LENGTH OF LEVER ARM ADJUSTMENT IN CONDITION
RESPONSIVE MECHANISM
Filed Oct. 8, 1968

United States Patent Office 3,507,191
Patented Apr. 21, 1970

3,507,191
EFFECTIVE LENGTH OF LEVER ARM ADJUSTMENT IN CONDITION RESPONSIVE MECHANISM
Kenneth L. Shelter, Chili, N.Y., assignor to Sybron Corporation, a corporation of New York
Filed Oct. 8, 1968, Ser. No. 765,811
Int. Cl. F16j 3/00; G01l 7/06
U.S. Cl. 92—34                              8 Claims

ABSTRACT OF THE DISCLOSURE

A bellows has a stud on its free end. The stud goes through a slot in a beam. A circular disc is rotatably mounted off center on the stud. A pair of flat lugs or the beam straddle a diameter of the disc and are aligned with the slot. The disc is turned to shift the stud along the slot and itself normal to the length of the slot.

---

This invention relates to condition responsive mechanisms of the type wherein a chamber such as a bellows deflects a rigid beam by expanding and contracting in response to fluid pressure applied to such chamber. The beam deflects about a given axis defined by a fulcrum of some sort and against some elastic resistance. Consequently, the deflected position of the beam is a function of the elastic resistance, the length of effective lever arm of the beam with respect to the fulcrum and the place to which the expansions and contractions of the chamber are applied. While the geometry and various individual properties of the involved structure determine the effective lever arm length, and other properties of the mechanism as a whole, these last cannot usually be calculated in advance with as much certitude as can be desired. For example, the geometrical axis of a bellows is nominally coincident with line of action of the bellows. In practice, the direction line of the bellows is likely to be spaced and/or skewed from its apparent geometrical axis. As a result, when the bellows is attached to the beam, there is some uncertainty about where on the effective lever arm of the beam the bellows really will act. Again, the actual location of the axis of beam deflection will also be somewhat different from what inspection of the fulcrum may suggest.

These peculiarities of real mechanisms are well known and, among other things, it is often the practice to provide for adjusting the bellows along the general direction of the beam's effective lever arm. The necessary amount of adjustment is determined by trial and error. For example, it is desired that a given quantitative relation between beam deflection and bellows pressure exist, so one variously adjusts the bellows along the beam, the elastic resistance to deflection, and the like, till the desired relation actually results upon application of pressure to the bellows.

In the present invention, bellows adjustment along the beam is provided by a cam. The beam has a slot along its length (i.e., nominally along its effective lever arm), and the bellows has a stud projecting through the slot. The cam is a circular sheet metal disc rotatably mounted off center on the stud, the beam being clasped between the bellows end and the cam. Straddling a diameter of the cam and aligned with the slot are two lugs on the beam. If the cam is turned, the stud must displace along the slot while the cam itself displaces in a direction normal to the slot length, the flexibility of the bellows allowing its studded end to displace radially of the bellows geometrical axis while the opposite end of the bellows remains fixed to a base or equivalent structure supporting the whole mechanism.

Figure 1:
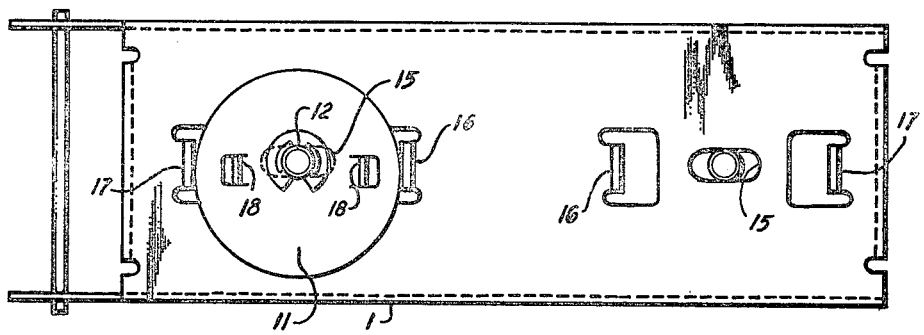

In the drawings, FIGURE 1 is a plan view of a differential pressure device using an effective lever arm adjustment in accordance with the invention.

Figure 2:
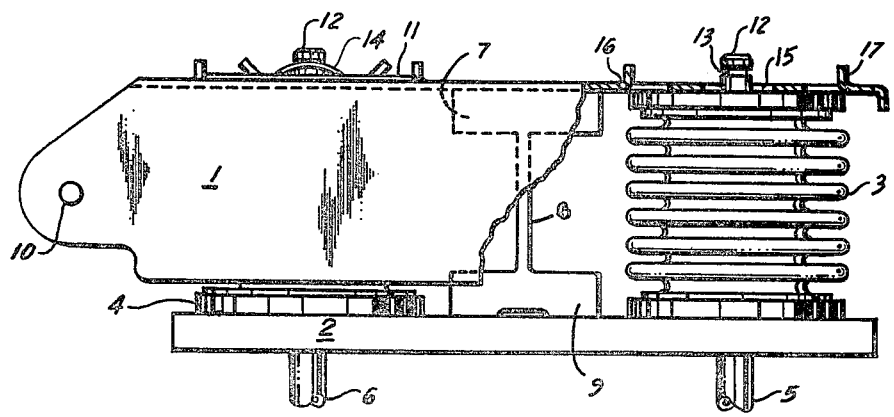

FIGURE 2 is an elevation view of such device, partly in section.

In FIGURES 1 and 2 a beam 1, in the form of a rigid box-type member formed out of sheet metal, and a rigid base 2 mount bellows 3 and 4 between them. Pipes 5 and 6 provide for admitting fluid under pressure to the interiors of the bellows for deflection of said beam about a cantilever flexure consisting essentially of flanges 7 and 9 and web 8. Suitable means (not shown) are provided rigidly securing the flanges to beam and base. The flexure may be regarded as a very stiff pivot controlling deflection of beam 1 in the plane of FIGURE 2 in response to a difference in the internal fluid pressures of the bellows 3 and 4. Only the base of bellows 4 is shown, but it may be regarded as nominally identical to bellows 3. The bellows are of elastic material, but may or may not be provided with spring rates contributing substantially to the total resistance to beam deflection. In any case, it is to be assumed that the resistance of the flexure to displacement of beam 1 horizontally is so much larger than that offered by bellows 3 and 4 together, that the force needed to deform these bellows by horizontally displacing their upper ends with respect to their lower ends would not significantly displaced the upper flange 7 of the flexure horizontally with respect to its lower flange 9. The reason for this relationship of stiffness of bellows and flexure will be made apparent below.

From what has been said before, it is evident that in a device of the sort shown the moments of the bellows on the beam 1 with respect to the deflection axis defined by web 8, which is the effective spring element of the flexure are nominally equal and opposite, save as there be a difference between the pressures within the bellows. Or stated otherwise, if a given difference of a given sense, between such pressures deflected the beam a given amount in one sense, then the same difference with the opposite sense would have caused an equal but oppositely-sensed deflection. It is evident that to attain such condition of functional symmetry, it is generally necessary to adjust the bellows' lengths of effective lever arm about the aforesaid axis. Such axis is not shown since because it is established by a cantilever, it is not definitely locatable for illustration purpose. Nonetheless, the flexure confines the beam deflection to a definite path that can be assumed always to be the same.

A shaft 10, or the like, at one end of the beam, provides means for connecting the beam to some mechanism to be actuated by deflection of beam 1. Such mechanism may take numerous forms, as is well-known, which need not be considered here. Merely by way of example, however, the structure shown in FIGURES 1 and 2 are particularly suited for use in mechanical organization such as are described and claimed in my copending application, Ser. No. 765,887, filed Oct. 8, 1969, entitled "Transducer Devices Having Flexures of Aluminum Material," and assigned to the assignee of the present invention.

Adjustment of effective lever arm length is by means of a cam 11. Normally, there will be two such cams, but it is not always necessary, and in any event, one is omitted to allow illustration of the structure with which the cam or cams cooperate.

The cam 11 is a flat circular sheet metal disc clamping the beam 1 between it and the upper end of the bellows, and being mounted off center on a stud 12 which projects up from the flat upper end of the bellows, as shown in the case of bellows 3. The stud is slotted annularly at 13, the lower side of slot 13 being spaced just the thickness of beam 1 plus the thickness of the disc 11 from the end surface of the bellows. A conventional spring washer 14 held by the slot 13, draws the cam 11, beam 1 and bellows end together into mutual contact. Actually, both bellows are slightly compressed between beam and base even when their internal pressures are equal. The arrangement just described assures play-free interconnection of bellows and beam, and also sufficient friction on cam 11 that it can be rotated to various positions about post 12 and remain thereat without having to be clamped by some additional means.

Stud 12 projects through a slot 15 in beam 1, the slot being just as wide as the stud, but somewhat longer along the lever arm of the bellows on the flexure. The post 12 is, in effect, a cam follower, and two additional cam followers 16 and 17 are provided for the cam 11, these latter followers conveniently being lugs struck up from the beam so as to have opposing parallel flat surfaces. These surfaces are spaced by just the diameter of the cam 11, and are aligned with the slot 15. Tabs 18 struck up from the cam 11 provide for turning it in place on stud 12. Being mounted off-center, the cam 11 is, in effect, a pair of members varying inversely in width, and passing between the pairs of followers formed by lug 16 and stud 12, and lug 17 and stud 12, respectively. Note that the cam has two surfaces that define the follower motion, namely, the circular periphery of the cam and the circular periphery of the hole in which it rotatably receives stud 12. Because this hole is off-center in the cam, the effective radius of the cam varies as it is turned, so the disc is, in fact, a variable radius cam.

The facing flat surfaces of the followers or lugs 16 and 17 are wide enough that at no time is there not a diameter of the cam 11 (i.e., a diameter of the circular contour thereof) between points of these two surfaces. Consequently, the stud 12 has to move along slot 15, and the bellows being horizontally flexible (and the flexure practically inflexible, in comparison), so must the upper end of the bellows. Such motion, of course, varies the effective length of lever arm of the bellows on the flexure.

It is obvious that certain modifications of the arrangement are possible, as for example, a reversal of parts, such as putting the lugs 16 and 17 on the end of the bellows and the stud 12 on the beam, the lugs being guided by corresponding slots in the beam, spaced from each other and being oriented in tandem along the direction shown for slot 15. However, the arrangement shown is much simpler to construct, and is therefore to be preferred. Though the adjustment structure is simple and lends itself to fabrication by punching and bending out of sheet metal, partly as an incident in forming the beam 1 itself, it is both sensitive and sturdy, as well.

Those skilled in the art will be aware of numerous uses to which the invention may be put, and of various modifications thereof, without departing from the invention as claimed hereinbelow. While in fulfillment of 35 U.S.C. 112 I have disclosed my invention in considerable detail, such disclosure is to be considered exemplary, rather than limiting.

I claim:

1. In a condition responsive mechanism comprising a beam, a base, a chamber, and fulcrum means, said fulcrum means providing for deflection of said beam about a given axis fixed with respect to said base, and said beam being rigid; said chamber having one portion fixed to said base and a second portion fixed to said beam at a place spaced from said given axis, and being responsive to variation in said condition for causing said portions to move toward or away from each other in correspondence to such variation, such motion being effectively along a direction line defined by the respective places to which said portions connect on said beam and base, and said portions being oriented so that said direction line in transverse to the effective lever arm of said beam with respect to said given axis; said portions also being movable with respect to one another transversely of said direction line and along the direction of said effective lever arm, except for said portions' fixation to said base and beam, and for said fulcrum's fixation of said beam to said base, and there being means elastically resisting deflection of said beam about said given axis, whereby the deflected state of said beam with respect to said given axis is a measure of said condition; said mechanism also including improved adjustment means for varying the length of said effective lever arm, said adjustment means comprising a movable cam, a first follower fixed on said beam, a slot through said beam, and said second portion, said second portion being a second follower on said chamber and projecting into said slot; said cam being mounted between said followers, being movable along a path transverse to a line defined by its contact with said followers, and being proportioned so that the dimension thereof on the last said line varies as the cam is moved along the last said path; there being means maintaining contact of said cam with said followers while said cam is moving along said last said path.

2. The invention of claim 1, wherein said cam is a rotary variable-radius cam, and is mounted on one of said followers for rotation on an axis defined by said one of said followers.

3. The invention of claim 1, wherein said beam has a third follower fixed thereto, said cam also contacting said third follower like it contacts said first and second followers, and being proportioned so that the dimension thereof on a line defined by such contact with said second and third followers varies as its first said such dimension, but inversely, as the cam is moved along said last said path; said second follower being between the other said followers with respect to the length of said slot.

4. The invention of claim 3, wherein said cam is a rotary variable radius cam, and is mounted on said second follower for rotation on an axis defined by said second follower.

5. The invention of claim 3, wherein said cam is circular, and is mounted off-center on said second follower.

6. A bellows and beam mechanism including a first member and a second member adjustably connected together, said first member having a slot and said second member having a stud mounted for sliding in and along said slot; a first cam follower fixed on said first member adjacent one section of said slot, a second cam follower fixed on said first member and adjacent a second section of said slot, and the section of said slot containing said stud being between said first and second followers; a cam having surface portions in contact with said stud and said cam followers, said cam being mounted on one of said members for motion with its said surface portions remaining in contact with said cam followers and said stud, and being shaped so that the dimension thereof between its contacts with said second and third cam followers is constant, whereas the dimension thereof between its contacts with said first follower and said stud varies inversely with that between said second follower and said stud, as said cam is moved; one of said first and second members being a bellows mounted for motion of one end thereof in response to pressure for deflecting said beam in response to pressure, and the other of said first and second members being a beam mounted for such deflection by said bellows.

7. The invention of claim 6, wherein said cam is a rotatable cam having a variable radius with respect to such rotation, and the said stud mounting said cam and defining the axis of said rotation.

8. The invention of claim 6, wherein said cam is circular and said stud mounts said cam for rotation off-center.

References Cited

UNITED STATES PATENTS

| | | | |
|---|---|---|---|
| 2,375,748 | 5/1945 | Broyles | 74—50 |
| 2,394,741 | 2/1946 | Beard | 74—50 |
| 2,446,385 | 8/1948 | Newell | 92—37 XR |
| 2,454,588 | 11/1948 | Baak | 92—37 XR |
| 2,816,443 | 12/1957 | Gomez et al. | 73—407 |
| 2,923,153 | 2/1960 | Westman | 73—407 XR |
| 3,062,053 | 11/1962 | Weber | 73—407 |
| 3,216,326 | 11/1965 | Rice et al. | 92—34 XR |

MARTIN P. SCHWADRON, Primary Examiner

L. J. PAYNE, Assistant Examiner

U.S. Cl. X.R.

92—37; 73—407; 74—50